United States Patent [19]

Kroposki et al.

[11] 3,862,273

[45] Jan. 21, 1975

[54] PREPARATION OF 0-ARYL 0,0-DIALKYL PHOSPHOROTHIOATES

[75] Inventors: Lorraine M. Kroposki, Walnut Creek, Calif.; Masao Yoshimine, Midland, Mich.

[73] Assignee: The Dow Chemical Company, Midland, Mich.

[22] Filed: Mar. 28, 1973

[21] Appl. No.: 345,583

[52] U.S. Cl. ................................ 260/973, 260/964
[51] Int. Cl. .............................................. C07f 9/18
[58] Field of Search .................................... 260/973

[56] References Cited
UNITED STATES PATENTS

| | | | |
|---|---|---|---|
| 2,928,864 | 3/1960 | Tabor | 260/973 |
| 3,565,976 | 2/1971 | Schrader et al. | 260/973 |
| 3,577,482 | 5/1971 | Hanna | 260/973 |

*Primary Examiner*—Lorraine A. Weinberger
*Assistant Examiner*—Richard L. Raymond
*Attorney, Agent, or Firm*—S. Preston Jones

[57] ABSTRACT

0-Aryl 0,0-dialkyl phosphorothioates are prepared by a method which comprises reacting in an organic solvent-water reaction medium, one molecular proportion of an 0,0-di(loweralkyl)phosphorochloridothioate with one molecular proportion of a phenolic compound. These compounds are useful as pesticides.

4 Claims, No Drawings

PREPARATION OF 0-ARYL 0,0-DIALKYL PHOSPHOROTHIOATES

PRIOR ART AND BACKGROUND OF THE INVENTION

Several methods of preparing the 0-aryl 0,0-dialkyl phosphorothioates are known. In one method, the compounds may be prepared by the reaction of an 0-aryl phosphorodichloridothioate and an alkali metal alcoholate or by the reaction of an 0,0-dialkyl phosphorochloridothioate and an alkali metal phenolate. The contacting of the reactants in such methods is carried out in an inert organic solvent and at a temperature of from about 15° to 80°C. When operating in accordance with such methods, the 0-aryl 0,0-dialkyl phosphorothioates are obtained in yields of about 55 percent or less. In still another method, the mixed phosphorothioate esters may be prepared in yields of about 75 percent by the reaction of an 0,0-dialkyl phosphorochloridothiate with an aqueous solution of a sodium phenolate in the presence of a copper catalyst.

Another method is taught in U.S. Pat. No. 2,928,864 wherein one molecular proportion of 0,0-di(loweralkyl)-phosphorochloridothioate is reacted in the absence of a catalyst and at a temperature of from 40° to 70°C. with from 1 to 1.5 molecular proportions of a phenolic compound. This reaction is carried out in the presence of an alkali metal hydroxide and water. This method has enjoyed some success but suffers from low product yields and purity when the phosphorous and phenolic compound reactants are employed in equimolar proportions. While high product yields are obtained when employing the phenolic reactant in molar proportions greater than one mole per mole of phosphorous reactant, the problems associated with the use of these higher proportions do not make this process overly attractive. A high phenolic waste by-product production is one of the major problems associated with the use of larger amounts of the phenolic reactant. This phenolic waste interferes with the purity of the desired product and increases the cost of preparing a high purity product. In addition, the phenolic waste must be treated to recover the phenolic starting material since its disposal, by conventional means, constitutes an ecological problem. Further, the recovery of the phenolic compound is necessary because of the high cost of this reactant. One method of recovery employed has been to acidify the aqueous phenolic reaction medium after product recovery recovering the regenerated phenolic compound therefrom and recycling it. This solution while effective in recovering some of the phenolic starting material, adds to the problem by requiring the handling of strong and corrosive acids and the disposal of the spent acid. A more economical method for the production of 0-phenyl 0,0-dialkyl phosphorothioate esters in superior yields and in high purity would be very desirable.

SUMMARY OF THE INVENTION

It has now been found that 0-aryl 0,0-di(loweralkyl)phosphorothioate esters corresponding to the formula

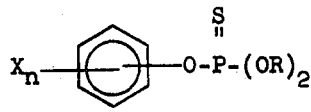

wherein X represents chloro or bromo; n represents an integer of from 0 to 3 and R represents loweralkyl of from 1 to 5 carbon atoms can be prepared by a method which comprises reacting, in the presence of an organic solvent-water reaction medium, equimolar amounts of an 0,0-di(lower-alkyl)phosphorochloridothioate with phenol or a bromo or chloro substituted phenol (hereinafter called phenolic compound or reactant) at a temperature of from about 10° to about 120°C. This reaction is further carried out under alkaline conditions by the addition of an alkali metal hydroxide or a mixture of an alkali metal hydroxide and boric acid to maintain the pH of the reaction mixture at about 8 to about 13 and preferably at 10.5 to 11.5.

In the present specification and claims, the term "alkali metal" refers to the metals sodium, potassium, lithium, cesium and rubidium. The term "loweralkyl" refers to alkyl radicals of 1 to 5 carbon atoms such as methyl, ethyl, n-propyl, isopropyl, n-butyl, isobutyl, secondary butyl, tertiary butyl and amyl.

The present method is an improvement over the method taught in U.S. Pat. No. 2,928,864 in that higher yields of high purity product are obtained when employing equimolar amounts of the reactants and the problems of disposing of excess phenolic compounds are avoided since no excess of the phenolic reactant is employed. When the process of U.S. Pat. No. 2,928,864 is carried out employing equimolar amounts of the reactants the yield of the product is low and the purity of the product is also low. By practicing the present improved method, the yield of the product is as high as that obtained when employing greater than equimolar amounts of the phenolic reactant without the concurrent problems of phenolic disposal or phenol recovery. The present method is also more economical and as stated hereinbefore, gives a product of very high purity.

The critical feature of the present improved method is in the use of an organic solvent-water reaction medium for carrying out the reaction. The water is usually present in an amount of from about 1 to about 3 moles per mole of the combined phosphorous and phenolic reactants and preferably from about 1 to 2 moles per mole of the combined reactants. The solvent is usually present in an amount of from about 0.1 to 2 moles of the solvent per mole of the combined phosphorous and phenolic reactants and preferably in the range of from about 0.5 to about 1.5 moles per mole of the combined reactants.

Suitable water-immiscible or substantially water-immiscible organic solvents which may be employed include xylene, cyclohexane, benzene, toluene, chloroform, chlorobenzene, methylene chloride, and nitrobenzene. The preferred solvent is methylene chloride.

In practice, usually the water and the alkali metal hydroxide are employed in the form of an aqueous solution with the alkali metal hydroxide being present in an amount sufficient to maintain the pH of the reaction mixture between about 8 and about 13. This aqueous solution contains from about 10 to about 50 percent alkali metal hydroxide. It is important to maintain the pH of the reaction mixture within the above range so as to insure the realization of the desirable results of the present invention.

Alternatively, the alkali metal hydroxide first can be reacted with the phenolic reactant to convert it to the alkali-metal salt. This reaction can be carried out by contacting the phenolic compound with the alkali metal hydroxide at a temperature of from about 50° to about 60°C. The water, solvent and phosphorous reactants are thereafter added and the reaction proceeds as hereinafter set forth.

Representative phosphorochloridothioate reactants include 0,0-dimethyl phosphorochloridothioate, 0,0-diethyl phosphorochloridothioate, 0,0-di-n-propyl phosphorochloridothioate, 0,0-di-ispropyl phosphorochloridothioate, 0,0-di-n-butyl phosphorochloridothioate, 0,0-di-sec-butyl phosphorochloridothioate, 0,0-di-t-butyl phosphorochloridothioate and 0,0-diamyl phosphorochloridothioate.

Representative phenolic reactants include among others phenol, 2-chlorophenol, 2-bromophenol, 4-chlorophenol, 4-bromophenol, 2,4-dichlorophenol, 2,4-dibromophenol, 3-chlorophenol, 3-bromophenol, 3,4-dichlorophenol, 3,4-dibromophenol, 2,5-dichlorophenol, 2,4,5-trichlorophenol, 3,4,5-trichlorphenol, 2,4,5-tribromophenol and 3,4,5-tribromophenol or the alkali metal salts of these phenolic compounds.

Representative compounds which can be prepared by the process disclosed and claimed herein, include among others, 0,0-dimethyl 0-phenyl phosphorothioate;
the 0,0-dimethyl 0-(mono-, di- and tribromophenyl)-phosphorothioates;
the 0,0-dimethyl 0-(mono-, di- and trichlorophenyl)-phosphorothioates;
0,0-diethyl 0-phenyl phosphorothioate;
the 0,0-diethyl 0-(mono-, di- and tribromophenyl)phosphorothioates;
the 0,0-diethyl 0-(mono-, di- and trichlorophenyl)phosphorothioates;
0,0-di-n-propyl 0-phenyl phosphorothioate;
the 0,0-di-n-propyl 0-(mono-, di- and tribromophenyl)phosphorothioates;
the 0,0-di-n-propyl 0-(mono-, di- and trichlorophenyl)phosphorothioates;
the 0,0-di-isopropyl 0-(mono-, di- and trichlorophenyl)phosphorothioates;
0,0-di-n-butyl 0-phenyl phosphorothioate;
the 0,0-di-n-butyl 0-(mono-, di- and tribromophenyl)phosphorothioates;
the 0,0-di-n-butyl 0-(mono-, di- and trichlorophenyl)phosphorothioates;
0,0-di-sec-butyl 0-phenyl phosphorothioate;
the 0,0-di-sec-butyl 0-(mono-, di- and trichlorophenyl)phosphorothioates;
0,0-di-t-butyl 0-phenyl phosphorothioate;
the 0,0-di-t-butyl 0-(mono-, di- and tribromophenyl)-phosphorothioates;
the 0,0-di-t-butyl 0-(mono-, di- and trichlorophenyl)-phosphorothioates;
and the 0,0-diamyl 0-(mono-, di- and trichlorophenyl)phosphorothioates.

The present process is normally carried out at a temperature of from between about 10° and about 120°C. and preferably between about 40° and about 80°C. The rate at which the formation of the phosphorothioic acid esters takes place has been found to vary with the temperature employed; the longer periods being employed at the lower temperatures. At temperatures in excess of the boiling point of the organic solvent, the reaction should be carried out under pressure above atmospheric pressure, whereas when operating below the boiling point of the organic solvent ambient atmospheric pressure is employed. When operating within the preferred temperature limits, reaction times of 0.5 to 24 hours, preferably 1 to 10 hours are sufficient for practical completion.

Upon the completion of the reaction, the reaction mixture is cooled to room temperature and the organic phase separated from the aqueous phase. The organic phase is washed with dilute alkali metal hydroxide solution followed by water washing. The solvent is removed by evaporation under reduced pressure leaving the desired product.

DESCRIPTION OF SOME PREFERRED EMBODIMENTS

In order that the present invention may be more fully understood, the following examples are given primarily by way of illustration and should not be construed as limitations upon the overall scope of the present invention.

EXAMPLE I

A solution consisting of 39.6 grams (200 millimoles) of 2,4,5-trichlorophenol and 8.6 grams (210 millimoles) of a 20 percent sodium hydroxide solution was heated at 55°C. for one (1) hour and cooled at 33°C. Thereafter 30 milliliters of methylene chloride was added to this mixture. To this mixture was added dropwise 33.6 grams (200 millimoles) of 0,0-dimethylphosphorochloridothioate over a period of 14 minutes. The mixture was thereafter heated at 53°C. for 6.75 hours while maintaining the pH at 11 by the dropwise addition of a 50 percent sodium hydroxide solution. At the end of this period, the reaction mixture was allowed to cool to room temperature and the organic phase separated from the aqueous phase. The organic phase was washed with 100 milliliters of a 5 percent sodium hydroxide solution followed by a wash with 100 milliliters of water. The methylene chloride was removed by evaporation under reduced pressure. The 0,0-dimethyl 0-2,4,5-trichlorophenylphosphorothioate product was recovered in a yield of 58.6 grams (91.6 percent of theoretical) and was found to be 98.9 percent pure.

EXAMPLE II

Additional runs were carried out following the procedures of Example I employing the same reactants and same solvents but using different temperatures and/or reaction times. The results of these runs are summarized in Table I which follows:

TABLE I

| Run | Amount of reactant A added in mm. (a) | Amount of reactant B added in mm. (b) | Water added in ml. (c) | Methylene chloride added in ml. (d) | Reaction Time in hours | Temperature in °C. | Percent yield of DMTCP product (e) | Purity of DMTCP product (f) |
|---|---|---|---|---|---|---|---|---|
| 1 | 200 | 200 | 34 | 30 | 6.75 | 53 | 91.6 | 97.6 |
| 2 | 200 | 200 | 34 | 30 | 6.25 | 52 | 89.2 | 98.8 |

TABLE I—Continued

| Run | Amount of reactant A added in mm. (a) | Amount of reactant B added in mm. (b) | Water added in ml. (c) | Methylene chloride added in ml. (d) | Reaction Time in hours | Temperature in °C. | Percent yield of DMTCP product (e) | Purity of DMTCP product (f) |
|---|---|---|---|---|---|---|---|---|
| 3 | 200 | 200 | 34 | 30 | 7.1 | 53 | 91.3 | 97.6 |
| 4 | 200 | 200 | 34 | 30 | 6.7 | 55 | 88.4 | 98.2 |

(a) Amount of sodium trichlorophenate reactant added in millimoles.
(b) Amount of O,O-Dimethyl phosphorochloridothioate reactant added in millimoles. (c) Milliliters of water added to reaction mixture.
(d) Milliliters of methylene chloride added to reaction mixture.
(e) Percent yield of DMTCP (O,O-Dimethyl 0-2,4,5-trichlorophosphorothioate)product obtained.
(f) Purity of DMTCP (O) O,O-dimethyl 0-2,4,5-trichlorophosphorothioate product.

Following the general procedure of Example I and employing the appropriate phenolic and phosphorous reactants, the following phosphorothioate esters are prepared.

0,0-dimethyl 0-phenyl phosphorothioate;
0,0-dimethyl 0-(2,4,5-tribromophenyl)phosphorothioate
0,0-dimethyl 0-(2,4-dichlorophenyl)phosphorothioate;
0,0-diethyl 0-phenyl phosphorothioate;
0,0-diethyl 0-(4-bromo phenyl)phosphorothioate;
0,0-diethyl 0-(2-chlorophenyl)phosphorothioate;
0,0-di-n-propyl 0-phenyl phosphorothioate;
0,0-di-n-propyl 0-(3,4-dibromophenyl)phosphorothioate;
0,0-di-n-propyl 0-(2,4-dibromophenyl)phosphorothioate;
0,0-di-isopropyl 0-(3,4,5-trichlorophenyl)phosphorothioate;
0,0-di-n-butyl 0-phenyl phosphorothioate;
0,0-di-n-butyl 0-(3-bromophenyl)phosphorothioate;
0,0-n-butyl 0-(2,5-dichlorophenyl)phosphorothioate;
0,0-di-sec-butyl 0-phenyl phosphorothioate;
0,0-di-sec-butyl 0-(3-chlorophenyl)phosphorothioate;
0,0-di-t-butyl 0-phenyl phosphorothioate;
0,0-di-t-butyl 0-(4-chlorophenyl)phosphorothioate;
0,0-di-t-butyl 0-(2,4,5-tribromophenyl)phosphorothioate;
and 0,0-diamyl 0-(2,4,5-trichlorophenyl)phosphorothioate.

What is claimed is:

1. In the process for preparing 0,0-di-(loweralkyl)phosphorothioate esters corresponding to the formula

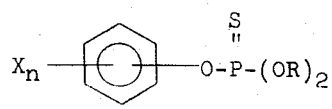

wherein X represents chloro or bromo; n represents an integer of from 0 to 3 and R represents loweralkyl of from 1 to 5 carbom atoms wherein equimolar amounts of a 0,0-di(loweralkyl)phosphorochloridothioate and phenol or a chloro or bromo substituted phenol are reacted at a temperature of from about 10° and about 120°C. and at a pH of from about 8 to about 13, the improvement which comprises carrying out the reaction in the presence of a reaction medium consisting of from about 1 to about 3 moles of water per mole of the combined phosphorochloridothioate and phenolic reactants and from about 0.1 to about 2 moles of a water immiscible organic solvent per mole of the combined phosphorochloridothioate and phenolic reactants and thereafter recovering the 0,0-di(loweralkyl)phosphorothioate ester so produced.

2. The process as defined in claim 1 wherein the organic solvent is methylene chloride.

3. The process as defined in claim 2 wherein the phenol reactant is 2,4,5-trichlorophenol and the phosphorochloridothioate reactant is 0,0-dimethyl phosphorochloridothioate.

4. The process as defined in claim 3 wherein the pH is maintained in the range of from 10.5 to 11.5 and the temperature is between about 40° and about 80°C.

* * * * *